R. V. FARNHAM.
GAS PRODUCER.
APPLICATION FILED APR. 30, 1913.
Reissued June 17, 1913. 13,578.
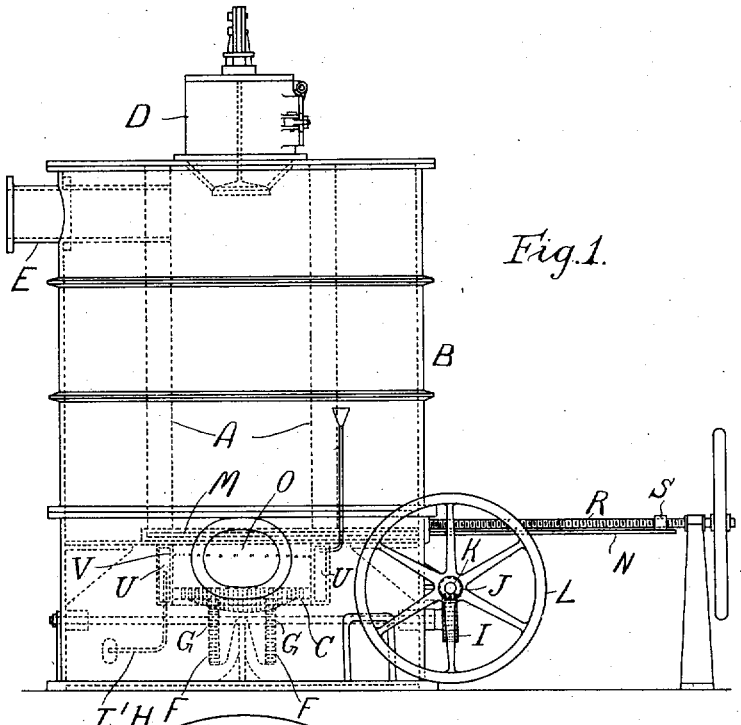
Fig. 1.
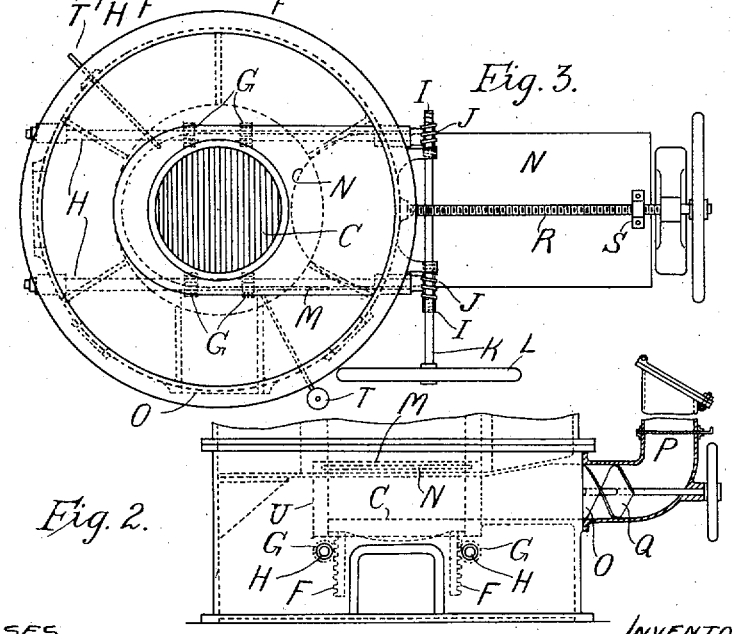
Fig. 3.
Fig. 2.
WITNESSES
John H. Hoving
Cornelius Hoving
INVENTOR
R. V. FARNHAM
BY H. Van Oldenneel
ATTORNEY
COLUMBIA PLANOGRAPH CO., WASHINGTON, D. C.

UNITED STATES PATENT OFFICE.

REGINALD VANDEZEE FARNHAM, OF SKELMORLIE, SCOTLAND, ASSIGNOR TO FARNHAM'S PATENTS LIMITED, OF GLASGOW, SCOTLAND.

GAS-PRODUCER.

13,578. Specification of Reissued Letters Patent. Reissued June 17, 1913.

Original No. 993,160, dated May 23, 1911, Serial No. 530,128. Application for reissue filed April 30, 1913. Serial No. 764,698.

*To all whom it may concern:*

Be it known that I, REGINALD VANDEZEE FARNHAM, a subject of the United Kingdom of Great Britain and Ireland, and residing at Skelmorlie, Ayrshire, Scotland, have invented certain new and useful Improvements in Gas-Producers, of which the following is a specification.

This invention relates to a gas producer of the suction or pressure type wherein the fuel is fed at each fresh charge on to a vertically movable grate coöperating with a separate horizontally movable plate so that the gases arising from the fresh charge are caused to pass through the incandescent fuel resting above the fresh charges, and the volatile matters and hydrocarbons are resolved into fixed gases.

In a producer embodying the invention the combustion chamber is formed with vertical walls, the cross sectional area of the combustion chamber, taken at any position between the uppermost level of the fuel and the lowest position of the grate, being uniform and equal to the area of the grate, whereby, on the upward movement of the grate, the fuel is uniformly compressed and clinker removed from the sides of the combustion chamber.

In the drawings Figures 1 and 2 are elevations at right angles to each other, and Fig. 3 is a plan of a gas producer constructed in accordance with the invention.

Referring to the drawings, the producer comprises a central combustion chamber A of fire brick located within a metal casing B, said chamber A having an outlet E for producer gas near its upper end and being surmounted by a hopper D through which is fed the fuel on starting. Fitted within the lower end of the chamber A is a grate capable of being raised vertically to carry with it the incandescent fuel or compress the fuel in the space above the grate, and for this purpose devices for lifting the grate are fitted in the space below the grate, these devices being operated from outside the generator casing. Said devices comprise racks F secured to the under side of the grate and pinions G secured on shafts H and in gear with said racks; the shafts H being mounted on the casing B and each shaft having secured to it a worm wheel I adapted to be operated by a worm J on a shaft K provided with a hand-wheel L. It will be understood that the grate normally supports all of the fuel in the producer. Said grate also, as shown, constitutes the sole means through which air may be supplied to the producer.

At about the height to which the grate is intended to be raised, there is provided a channel-shaped guide M in which a perforated metal plate N is arranged to be slid horizontally so as to pass through the incandescent fuel when the grate is in its raised position and to support all the fuel in the combustion chamber temporarily and thus permit the grate to be lowered; the combined area of the perforations in the plate N being equal to the area of the air inlet to the producer. When the grate C is lowered, the space left between the supporting plate N and the grate, after the grate has been cleaned by a cleat to prevent the formation of clinker, is fed with fresh fuel through a lateral opening O located just above the fire grate; which fuel may pass first through a chute P and be fed forward by means of a screw conveyer Q or the like; any suitable device being employed for distributing the fresh fuel over the fire grate. When the supporting plate N is withdrawn, the fresh fuel is quickly ignited by the incandescent mass above the same, and the volatile matters arising therefrom are resolved into fixed gases in passing through the incandescent mass. The plate N is operated by means of a screw-threaded spindle R engaging a nut S secured to said plate.

Steam is obtained from the supply of water flowing through inlet and outlet pipes T, T¹, which pipes pass through the casing B and are connected with an annular water jacket U which is shown as forming an extension of the combustion chamber in which the grate moves, the jacket being of the same cross sectional area as the remainder of the combustion chamber A; the jacket is formed with outlets V located below the plate N, and the lowermost position of the grate, and serving to admit into the combustion chamber steam rising from water in the jacket.

Having now described my invention what I claim and desire to secure by Letters Patent of the United States is:—

1. A gas producer comprising a combustion chamber formed with continuous walls and having an outlet for producer gas near its upper end, a vertically movable grate fitted within the chamber near its bottom for normally supporting all of the fuel in the producer and constituting the sole means through which air may be supplied to the latter, said grate being of an area equal to that of the lower portion of the chamber and the latter portion being of uniform cross sectional area from the uppermost position of the grate to the lowermost position of such grate, in combination with mechanism, below the grate, for raising the latter to compress the fuel into the combustion chamber; a transversely movable plate in said chamber at a point above the grate for temporarily supporting the fuel when the grate is lowered, and mechanism for operating said plate.

2. A gas producer comprising a combustion chamber having an outlet for producer gas near its upper end and having a hollow extension from its lower end of uniform cross sectional area equal to that of said end, said extension constituting a water-jacket, a vertically movable grate fitted within the said extension, for normally supporting all of the fuel in the producer and constituting the sole means through which air may be supplied to the latter, said grate being of an area equal to that of said extension; in combination with mechanism, below the grate, for raising the latter to compress the fuel in the combustion chamber; a transversely movable plate in said chamber at a point above the grate for temporarily supporting the fuel when the grate is lowered, and mechanism for operating said plate; the said water-jacket having outlets in the combustion chamber below the movable plate.

In testimony whereof I have signed my name to this specification in the presence of two subscribing witnesses.

REGINALD VANDEZEE FARNHAM.

Witnesses:

WALLACE CRANSTON FAIRWEATHER,
JOHN MCCLEARY.

Copies of this patent may be obtained for five cents each, by addressing the "Commissioner of Patents, Washington, D. C."